United States Patent [19]

Beylkin

[11] Patent Number: 4,760,563

[45] Date of Patent: Jul. 26, 1988

[54] SEISMIC EXPLORATION USING EXACTLY INVERTIBLE DISCRETE TRANSFORMATION INTO TAU-P SPACE

[75] Inventor: Gregory Beylkin, Wilton, Conn.

[73] Assignee: Schlumberger Technology Corporation, New York, N.Y.

[21] Appl. No.: 817,390

[22] Filed: Jan. 9, 1986

[51] Int. Cl.$^4$ .............................................. G01V 1/00
[52] U.S. Cl. ........................................ 367/73; 367/43
[58] Field of Search ....................... 367/49, 43, 63, 73, 367/74, 40; 364/421, 422

[56] References Cited

U.S. PATENT DOCUMENTS 4,562,540 12/1985 Devaney ............................... 73/602

OTHER PUBLICATIONS

Harding, "Inversion Methods for T-P Maps of Near Offset Data-Linear Inversion", Geophysical Prospecting, 33, pp. 674-695, 1985.

Chapman, C. H., "Generalized Radon Transforms and Slant Stacks", Geophysics J. R. astr. Soc., 66, 1981, pp. 445-453.

Phinney, et al., "Transformation and Analysis of Record Sections", Journal of Geophysical Research, vol. 86, No. B1, Jan. 10, 1981, pp. 359-377.

Chapman, C. H., "A New Method for Computing Synthetic Seismograms", Geophysics J. R. astr. Soc., 54, 1978, pp. 481-518.

Beylkin, G., "Imaging of Discontinuities in the Inverse Scattering Problem by Inversion of a Casual Generalized Radon Transform", J. Math. Phys., 26 (1), Jan. 1985, pp. 99-108.

Stoffa, et al., "Direct Mapping of Seismic Data to the Domain of Intercept Time and Ray Parameter—A Plane-Wave Decomposition", Geophysics, vol. 46, No. 3, Mar. 1981, pp. 255-267.

Nakhamkin, S. A., "Fan Filtration", Izv. Earth Physics, No. 11, 1969, pp. 24-35.

Tatham, et al., "Application of the Tau-P Transform (Slant Stack) in Processing Seismic Reflection Data", Preprint of Paper Presented at 52nd Annual Meeting of SEG, 1982, Dallas.

Beylkin, G., "The Inversion Problem and Applications of the Generalized Radon Transform", Commun. Pure Appl. Math, 37, 1984, pp. 579-599.

Beylkin, G., "Inversion of the Generalized Radon Transform", Proceedings of SPIE, Inverse Optics, vol. 413, 1983, pp. 32-40.

Beylkin, G., "Generalized Radon Transform and its Applications", Ph.D. Thesis, NYU, 1982.

Bessonova et al., "The Tau Method for Inversion Travel Times—I. Deep Seismic Sounding Data", Geophysics J. R. astr. Soc., 36, 1974, pp. 377-398.

(List continued on next page.)

Primary Examiner—Thomas H. Tarcza
Assistant Examiner—Daniel T. Pihulic
Attorney, Agent, or Firm—Cooper & Dunham

[57] ABSTRACT

Disclosed are a method and a system for discrete transformation of measurements such as seismic data into and out of tau-p space which is both exact and practical in terms of processing time. The measurements can be filtered or otherwise processed in tau-p space in ways which are not practical or possible in their original space. Since the transformations into and out of tau-p space are exact, the filtered and transformed measurements are free of errors and distortions that perturb known approximate transforms which can be performed in a reasonable time. When the transformation process is carried out in frequency space, it is done frequency-by-frequency, and when it is carried out in the spatial domain, it can utilize a transformation matrix having a block-circulant structure. In each case, the transformation process and matrix have a structure which substantially reduces storage and processing requirements as compared with known prior art.

47 Claims, 10 Drawing Sheets

OTHER PUBLICATIONS

Bessonova et al., "The Tau Method for Inversion of Travel Times—II. Earthquake Data", *Geophysics J. R. astr. Soc.*, 46, 1976, pp. 87–108.

Iannino, et al., "A Survey of the Hough Transform and Its Extensions for Curve Detection", *Proceedings of the IEEE Computer Society on Pattern Recognition and Image Processing*, IEEE, N.Y., 1978, pp. 32–38.

Kimball, et al., "Semblance Processing of Borehole Acoustic Array Data", *Geophyics*, vol. 49, No. 3, Mar. 1984, pp. 274–281.

Buonocore, et al., "A Natural Pixel Decomposition for Two-Dimensional Image Reconstruction," *IEEE Transactions on Biomedical Engineering*, vol. BME-28, No. 2, Feb. 1981, pp. 69–78.

Jain, "Fast Inversion of Banded Toeplitz Matrices by Circular Decompositions," *IEEE Transactions on Acoustics, Speech, and Signal Processing*, vol. ASSP-26, No. 2, Apr. 1978, pp. 121–126.

DRT APPLIED TO DATA IN FIG.3

RECONSTRUCTION WITH WINDOW IN FIG.4

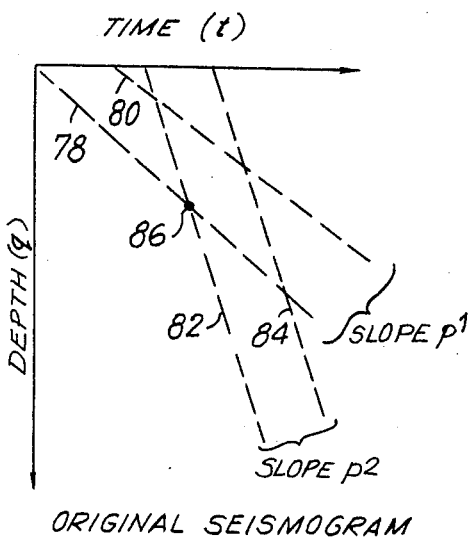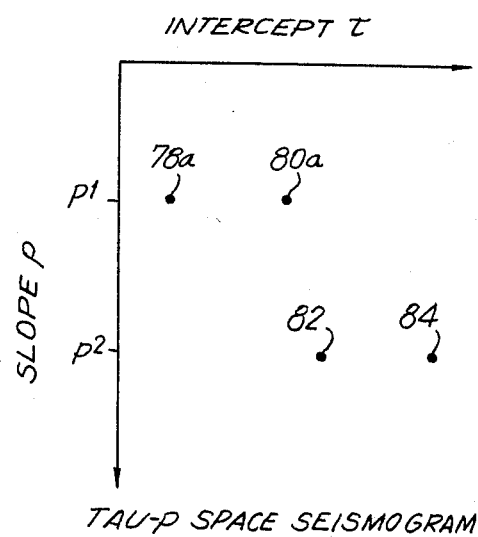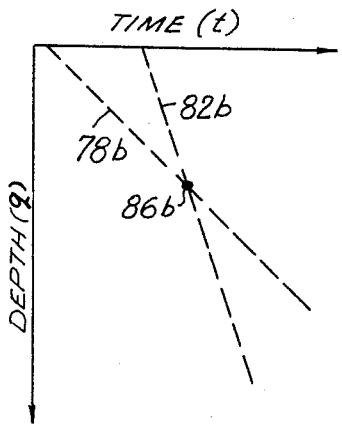

FIG. 9 DEFINITION OF THE TRANSFORM MATRICES

SEISMIC EXPLORATION USING EXACTLY INVERTIBLE DISCRETE TRANSFORMATION INTO TAU-P SPACE

BACKGROUND AND SUMMARY OF THE INVENTION

The invention is in the fields of seismic exploration for oil, gas and other underground resources and of improving time and space sampled measurements similar to those used in seismic exploration. One aspect of the invention pertains to improving seismic traces by transforming a seismogram into tau-p space, filtering or otherwise processing it in tau-p space, and then if desired inverse-transforming it back into its original space. Another aspect pertains to similarly processing other measurements or data.

The ability to process seismograms in tau-p space is desirable because many operations can be carried out in tau-p space to make the seimograms more useful which could not be done practically, or at least conveniently, in the space of the original seismogram, e.g., in time-offset space. Exactness of the transformation into and out of tau-p space is desirable because otherwise artifacts can be introduced by the inexactness of the transformation and be indistinguishable in the inverted seismogram from actual features of the underground formations. The term "exact" and "inexact" as used herein in connection with the forward and inverse transformations refer to accuracy of results which is inherent in the transformation and is independent of the accuracy of any arithmetic techniques or any equipment used to help carry out the transformations. Thus with respect to a particular transformation "exact" means exact within the accuracy of the arithmetic techniques and the equipment used to carry out that transformation.

In the known prior art it is theoretically possible to use a continuous form of the transformation into and out of tau-p space in order to achieved exact inversion, but this is not believed to be practical for the typical seismic survey, where vast amounts of measurements are taken, typically in digital form, and digital computer equipment is used to process them. It is also theoretically possible to obtain exact inversion by directly discretizing the continuous form of the transformation and treating the inversion as a solution to a linear system of equations. This is not believed to be practical because the nature of the transformation would make the processing time prohibitively long for the typical seismic survey. As a result, it is believed that the prior art transformations into and out of tau-p space use discretized forms of the continuous transformation with compromises which can make the processing time manageable but as a consequence can introduce significant artifacts indistinguishable from features of the underground formations. Thus, exact transformations using the known prior art do not appear to be practical, and the practical prior art transformations can be excessively inexact. This has long been known, and a longstanding need is believed to have existed for a way to transform seismograms into and out of tau-p space with high accuracy and yet within a practical span of time.

The invention meets this need by providing a new kind of a discrete transformation into and out of tau-p space which is both exact and practical in terms of processing time. For example, it is believed that the ratio in processing time in the case of transforming a real-life seismogram into and out of tau-p space can be of the order of 1:1000 as between using this invention and using a known prior art technique of exact transformation on the basis of direct discretization of the continuous transform and solving a linear system of equations for the inversion, i.e., that using the same equipment, the invention would take one minute to do what such prior art would take 1000 minutes (16.66 hours) to do. In addition, the invention makes it possible and practical to transform into tau-p space along selected curves rather than straight lines only, and to weight selected lines or slopes so as to enhance or suppress their significance. It is believed that in the prior art such transforms (using curves and or weighting) were not practical because the known inversions introduced unacceptably excessive errors.

Seismic profiling is one of the major techniques for exploring subsurface formations, for example for the purpose of finding and/or evaluating underground resources such as hydrocarbon deposits. Seismograms are often represented as traces in time-offset space, and often correspond to a planar vertical section through the subsurface formations. Typically, but not necessarily, a seismic trace corresponds to a selected source position on the surface, often called a shotpoint, and a selected receiver position relative to the source position, often called an offset. One form of a seismogram is a collection of such traces for a fixed shotpoint placed along the offset axis in accordance with the respective offsets between the respective receiver positions and the shotpoint. The two-way travel times of reflections from subsurface interfaces of layers which have different acoustic properties show on the trace along the time axis. For some purposes, the time axis is converted to a depth axis. Two major types of seismic exploration are horizontal seismic profiling (often called reflection seismics or surface seismics, and including large-offset surface seismics) and vertical seismic profiling (often abbreviated as VSP).

Subsurface reflection seismology involves mapping of subsurface formations on the basis of the arrival times of events reflected from subsurface layers. Seismic energy generated at the surface penetrates the earth's layered media and some of it is reflected at the interfaces between layers. The reflected energy arriving at the surface is measured by receivers (also called detectors or geophones). On land, seismic energy typically is generated by chemical explosions, vibrating machines or thumping devices. Preplaced receivers arranged in an array or "spread" detect the seismic energy which comes back. At sea, or other bodies of water, a source such as an array of air guns towed behind a ship is actuated every few seconds as the ship moves over a predetermined course. The returning seismic energy is picked up by detectors which typically are embedded in a cable (a streamer) trailing the ship.

Vertical seismic profiling, or VSP, is a technique in which a seismic signal generated at or near the surface of the earth is recorded by receivers secured at various depths to the wall of a borehole. While in reflection seismics the receivers are strung along the earth's surface (or along a nearly horizontal cable trailing a ship), in VSP the receiver locations are strung along the borehole axis. Moreover, in VSP the receivers respond both to downgoing and upgoing seismic events, in contrast to reflection seismics, where the receivers typically do not respond directly to downgoing events. The spacing between receiver locations in VSP typically is a small fraction of that used in reflection seismics.

A VSP seismogram is often represented in time-depth space, rather than the time-offset space common in reflection seismics. The depth axis is depth into the earth, and the time axis is time taken by the seismic wave to travel from the surface to a given depth.

The complexity of subsurface structures and the noise and other imperfections of the observed signals make it necessary to process these signals through a number of steps in order to make them more useful for their ultimate purpose of finding and evaluating subsurface resources. In the case of horizontal profiling, those steps typically include both static and dynamic corrections of the receiver outputs. The static corrections can include a source correction and a receiver (detector) correction, the combined effect of which is to put the seismic energy source and the receivers in the same fictitious horizontal plane. In practice, this is done by appropriately time-shifting the respective receiver outputs. The dynamic corrections convert each receiver output to the output which it would have produced if the source and receiver were at the same lateral point, e.g., the point midway between the actual source and receiver positions along the fictitious horizontal plane. In this conversion the traces are considered to be made up of primary reflections, i.e., the receipt of acoustic energy which has traveled from the source directly down to a reflector and then directly up to the receiver. If the layers are horizontal then all the reflection points (depth points) are directly beneath the midpoint between the actual source and receiver positions. If the layers are dipping then the depth points are offset from this midpoint. The dynamic corrections thus depend both on the dip of the reflecting beds and on the velocity function (the respective velocities of the acoustic signal in each layer traversed by the relevant ray paths). Seismic waves have a velocity which is very much dependent on the nature of the propagating medium, and this velocity can change significantly as the waves travel through different layers. If a suitable borehole is available at the right place and can be logged, the velocity function can be estimated from logs (e.g., acoustic logs) or from vertical seismic profiling. In most cases, however, the velocity function must be estimated from surface measurement, using sophisticated processing. Once the velocity function is available, both components of the dynamic correction can be carried out—the "normal moveout correction" which accounts for the separation between source and receiver and the "dip correction" which accounts for the dip of the relevant subsurface layers. The same velocity function can be used to convert the time-offset traces into depth-offset form, to make the seismogram resemble an anatomical section through the subsurface formations.

Each observed signal (recorded trace) can be considered as made up of reflected waves together with various interfering waves and noise. The desired reflected events typically are the primary reflections. In an effort to suppress events other that primary reflections, typically multifold coverage is recorded by laying out a source and a spread of receivers, activating the source and recording the receiver outputs, then moving the entire configuration along the receiver line and repeating the process. If the increment of movement between shots is small as compared to the receiver spacing, considerable redundancy is introduced which allows the subsequent enhancement of the primary events and suppression of multiples (events reflected more than once before reaching a receiver) and some other noise. If all the traces in a prospect are sorted (gathered) into "gathers" such that all traces in a gather have a common midpoint between the source and receiver, the appropriate moveout correction should convert each trace in a given gather into about the same equivalent trace, namely that primary reflection trace which would have been received if the source and receiver were directly at the common midpoint in question. Stated differently, the primary reflections of all the traces after appropriate moveout should tend to be in phase while the multiples and perhaps some of the other noise should be out of phase. If this approach is used for the normal moveout correction first, then it can also be applied to making the appropriate source and receiver and dip corrections by different gathering of the traces. In the alternative, a simultaneous correction can be used. Thus, one output trace for each midpoint can be produced, which is commonly called the stacked trace for that midpoint. This addresses the multiple reflections (and perhaps some other noise), but an additional process, called deconvolution, is typically used for the so-called reverberation components of the traces. After deconvolution, the signals typically are subjected to a process called migration of depropagation, which can be conceptualized as a process of propagating the waves observed at the surface with the receivers backward in time into the earth to reveal the actual spatial position of the subsurface reflection points at depth. This process is also described as the transformation of signals observed at the surface to signals which would have been observed at depth. Another way of conceptualizing this is to think of a process in which it is desirable to go to a given point in the reconstruction of a seismic map and to check if there is a subsurface reflector at that point. To accomplish this, one can go to the seismic data and integrate along a time-distance curve dictated by a background model. If there is a reflector at the given point of interest, the data are affected to the greatest extent.

VSP involves some similar processing of the receiver outputs, as well as some processing unique to the VSP environment, and can give insight into some fundamental properties of the subsurface formations and assist in the structural, stratigraphic and lithological evaluation and interpretation of these formations. For example it can help differentiate between primary reflections and multiples, estimate reflector dip, correlate shear wave reflections with compressional wave reflections, locate fault planes, determine lithological (and hydrocarbon) effects on propagating wavelets, look for reflectors ahead of the drill bit, identify intrabed multiples, measure the velocity function for both compressional and shear waves, and estimate the conversion of compressional to shear and shear to compressional energy modes within the earth.

While seismic records have long been processed and often presented for viewing and evaluation in time-offset or time-depth space, in some cases it is desirable to convert them to tau-p space, where a number of filtering and other processing operations can be carried out more effectively to improve those records. For example, it is often believed desirable to process seismograms in tau-p space in order to isolate ground roll and refractions from reflections, to carry out beam steering by limiting the angle of incidence, to separate P-waves and mode-converted S-waves and to combine multicomponent recordings, as well as to carry out other filtering and signal modifying processes. While in the usual seismogram one axis represents two-way travel time and the other offset along the surface, or one represents travel time and the other depth into the earth, in tau-p space one axis can represent two-way reflection time at zero offset distance and the other can be a set of traces each of which corresponds to a particular "p" or ray parameter. This p parameter can be expressed in different ways, as is known in the art. Each trace is in tau-p space can represent a single angle of incidence of the actual seismic signal at the surface. Thus, events can be separated by angle of incidence at the surface, and multiples become periodic in tau-p space. After filtering or other processing in tau-p space, the seismogram can be converted back to the more familiar time-offset or time-depth space.

The transformation to tau-p space can be conceptualized as integration along lines. The integral along a line in time-offset or time-depth space transforms to a point in tau-p space. The succession of points making up a trace in tau-p space can be conceptualized as made up of the respective integrals of a corresponding succession of parallel lines in time-offset or time-depth space. Mathematically, the transformation (if continuous) can be described as the Radon transform, published in 1917 by the German scientist Radon. The transform discussed by Radon is continuous, while in real life a seismogram typically is discrete both temporally and spatially—i.e., the outputs of spaced-apart receivers are typically digitized into time-samples. Thus, seismograms are represented in discrete rather than continuous form. Moreover, the digital computer equipment typically used to process seismic receiver outputs also typically operates on discrete rather than continuous signals. For these reasons, various discrete form approximations of the Radon transform are believed to be used currently to transform time-offset spacde seismograms to tau-p space seismograms, and discrete approximations of the inverse Radon transforms are believed to be used to convert back to time-offset space. To the knowledge of the inventor herein, it was believed prior to this invention that there was no discrete form of the Radon transform which could provide an exactly invertible transformation within a practical time frame in the context of the typical amount of measurements collected in a seismic study. It is believed that the prior art compromises made in order to make the processing time manageable led to artifacts which, given the complexity of the seismic data and of the transformation process itself, are such that no precise answer could be given in important cases as to whether a given feature in the filtered, inverse-transformed seismogram is indeed a feature of the subsurface formation or an artifact due to the inexact transformation. In this context the inexactness of interest is not the normal rounding off of numerical values inherent in digital computer operation, but the fundamental and heretofore believed unavoidable (except by devoting an impractical amount of computer power and time) inexactness of an approximation of a transformation defined only in continuous form. It is believed therefore that a long-felt, but unsolved, need existed to find a way to convert to tau-p space by a discrete transform which is exactly invertible in a practical time frame within the accuracy limits of digital computer equipment. An important aspect of the invention is to meet that need.

The invention makes use of the unexpected discovery that, contrary to previous thought, a discrete form can be defined of a transform to tau-p space which makes the tau-p space seismogram exactly invertible in a practical time span. Both the new transform and the seismogram are in discrete form, and yet what was heretofore thought impossible does in fact occur—the transform is exactly invertible within a practical time span. Using the new technique, a seismogram can be transformed to tau-p space, then transformed back to the space of the original seismogram within a practical time span, and be identical to it within the accuracy limitations of the digital computer equipment employed for the purpose. Of course, the point is to filter or otherwise process a seismogram in tau-p space for the purpose of improving it. As a result, when inverse-transformed the modified seismogram usually would differ from the original seismogram. However, for the first time now one can be assured that the features of the inverse-transformed seismogram are not artifacts due to any inherent inexactness of the transformation and inverse-transformation, even though the transformations can be completed within a practical time span.

In a particular and nonlimiting embodiment, the invention comprises deriving a seismogram of selected subsurface formations, transforming it to tau-p space through a discrete transformation which makes the tau-p space seismogram exactly invertible within a practical time span, and processing the seismogram in tau-p space to enchange desirable features thereof and thereby generate an improved seismogram.

The original seismogram can be derived in any suitable known way, for example by measuring the outputs of suitable receivers and, if desired, processing those outputs through part or all of the appropriate prior art processes to improve it (in part or as much as possible in the prior art). In the alternative, the original seismogram can be recorded in a suitable storage medium and derived by reading it out therefrom. The recorded seismogram also can comprise the outputs of seismic receivers, or those outputs as improved by partial prior art processing (in which case additional prior art processing can be used, if desired, as a part of the deriving step), or it can be a seismogram fully processed by desired prior art techniques such as stacking. The original seismogram can be in time-offset space, in time-depth space, or in some other space transformable to tau-p space.

If desired, the seismogram after transformation can be left in tau-p space. A tangible representation thereof can be provided for evaluation or other utilization, for example by displaying a visible representation thereof on a screen or by printing a hard-copy, or by storing it, for example in a suitable computer memory, for further processing or use.

In the alternative, the seismogram after filtering or other processing in tau-p space can be inverse-transformed from tau-p space using a new, discrete form of an inverse transform in accordance with the invention to thereby generate an improved seismogram in a space such as time-offset space or time-depth space, or some other space into which inversion from tau-p space is possible. Again, a tangible representation of this improved seismogram can be provided, for example by displaying a visible representation thereof on a screen or by printing a hard-copy, or by storing it, for example in a suitable computer memory, for further processing or use.

In a more specific, and still nonlimiting embodiment, the invention comprises deriving a seismogram of selected subsurface formations. The seismogram can be represented as a set of traces each comprising discrete samples of a selected seismic parameter, i.e., as a two-dimensional array of time samples of the seismic parameter. This array, which can be called the original seismogram although in fact it may have been processed in conventional ways, is transformed into tau-p space by converting it to frequency space, for example through a discrete Fourier transform (DFT) process, multiplying the resulting frequency space array by selected transformation matrices, independently for each frequency, to derive respective product arrays which are in frequency space, and inverse transforming the product arrays from frequency space to derive a representation of the seismogram in discrete form in tau-p space, which can be in the form of a two-dimensional array similar in structure to the original seismogram. The resulting seismogram in tau-p can be modified by suitable filtering or other processing in tau-p space. The resulting seismogram is in tau-p space and can be called a modified or filtered seismogram.

Thereafter, and if desired, in order to convert the modified seismogram back to another space, for example that of the original seismogram, the process comprises transforming the modified seismogram into frequency space, for example by using a DFT process, multiplying the frequency space version of the modified seismogram by selected adjoint transformation matrices of the original transformation matrices, frequency-by-frequency, to derive respective adjoint product arrays, then using the adjoint matrices and the original transformation matrices to derive selected matrices for filtering, solving for the array a linear relationship between the array, the matrices for filtering and the adjoint product arrays frequency-by-frequency, and inverse-transforming the last-recited array out of frequency space to thereby generate a seismogram of said selected subsurface formations which corresponds to said modified seismogram in tau-p space but is represented as a set of traces in another space, for example, in the space of the original seismogram.

The terms original seismogram and seismic trace are used herein in a broad sense, and are not limited to the typical time-offset or time-depth representations. For example, these terms can apply to depth-offset representations, and to any other representation which is in a space (or domain) which can be converted to tau-p space in accordance with the techniques described herein, or equivalent techniques. Similarly, the term tau-p space is used both to refer to Radon transform space and to any equivalent space (or domain) resulting from transforming an original discretized representation to a new discretized representation in a new space (or domain) in which each point results from a combination (sum) of values along a corresponding selected curve in the original representation, and the new representation being invertible to the original one. The term "curve" is used in this context to include a narrow strip which can be straight or curved, and the term "point" is used to mean an elemental area or a pixel (picture element). The invention makes it possible to use "curves" which need not be along straight lines, i.e., they can actually bend in a desired manner. In the broadest application of the invention, a "curve" includes any geometrical shape, continuous or disjoint. It also makes it possible to weight selected curves to enhance or suppress the influence of selected parameters of the underground formations on the measurement process.

Although described herein primarily in the context of its application to seismic exploration, the invention is not limited thereto. Thus, in another non-limiting embodiment an original record is made of measurements of a selected parameter of energy (such as electromagnetic or nuclear) propagating in a medium and sampled in time and space (corresponding to measuring the amplitude of seismic energy propagating in a formation, in time and depth or offset). This original record is transformed to a record in tau-p space, as defined above, through a discrete transformation having the characteristics described earlier in respect of application of the invention to seismograms. This tau-p space record is processed to enhance desirable features thereof and, either simultaneously or subsequently, effect an exact discrete inverse transformation from tau-p space to generate an improved record. Finally a tangible representation of the improved record is produced for further processing, inspection or the like.

In another aspect of the invention, an original record is made of data for a selected parameter sampled with respect to two independent variables (such as time and space, or two spatial coordinates) defining an original domain. This original record is then transformed to a different domain in which each point results from a sum of values of the selected parameter taken over a corresponding pattern in the original domain (an example of a pair of domains having this relationship is the time-space and tau-p domain pair). To this end a discrete transformation is used which permits exact discrete inverse-transformation and which in processing in a frequency domain corresponding to one of the independent variables can be completed frequency-to-frequency and in processing in the original domain with respect to the other of the independent variables can utilize a transformation matrix having a block-circulant structure. Processing to enhance desirable features, exact discrete inverse transformation to generate an improved record and production of a tangible representation of the improved record then take place as already described. A practical example of such an application is automatic character recognition to enable mechanized reading of lines of printed or written text.

While processing in frequency space is one way of implementing the invention, it is also possible to carry out another version of the invention without need for frequency space transformation, by using transformation matrices which correspond to those discussed above, but are represented in the spatial domain. Which version is applied in a particular case can depend on factors such as the nature of a particular seismic survey and the available processing equipment.

A key aspect of the invention is the provision of a structure in the forward transformation (into tau-p space) which is chosen to make the inverse transformation exact within practical processing time. An important factor in this is the discovery of a transformation matrix which when in the spatial domain forms a block-circulant matrix and when in the frequency domain makes it possible to process all the needed seismic data one frequency at a time. Because of the block-circulant property, the transformation matrix in the spatial domain need not be stored in full or proceed in full—a single row of blocks can be stored and recirculated to derive all other needed rows. In the frequency domain, the nature of the transformation matrices in practicing the invention is such that one matrix for a given frequency takes care of processing all the needed seismic data relating to that frequency. The transformation matrices in frequency space can be generated as needed, or only a few needed parameters describing them may be stored.

In contrast, in the prior art the known exact discretized transformations into and out of tau-p space can require storage and manipulation of extremely large matrices. Taking as an example a simplistic case of an original seismogram comprising 10 traces of 1000 samples each, a prior art technique can require storing and manipulating a matrix of 10 exp 8 elements. If the prior art technique when inverting from tau-p space is to consider the sought seismogram in time-offset space as a linear system of equations having 10,000 unknowns, it is seen that even in this simplistic case the number of operations to find these unknowns is about 10 exp 8. In contrast, the corresponding number of operations using an example of the invention is about 10 exp 5 similarly extensive operations, with much reduced storage requirements as well. This is the same order of magnitude as in the case of the known prior art in which compromises are made which make the transformation inherently inexact.

BRIEF DESCRIPTION OF THE DRAWINGS

FIGS. 6a, 6b and 6c are useful for conceptualizing a transformation from time-depth into tau-p space and inverse-transforming into time-depth space.

DETAILED DESCRIPTION

As earlier noted, one exemplary embodiment of the invention is used in processing VSP seismograms, another in processing seismograms from reflection seismics, and other embodiments can be used to process signals of a similar nature. The derivation and nature of relevant VSP and reflection seismics signals are described below in connection with FIGS. 1 and 2.

Figure 1:
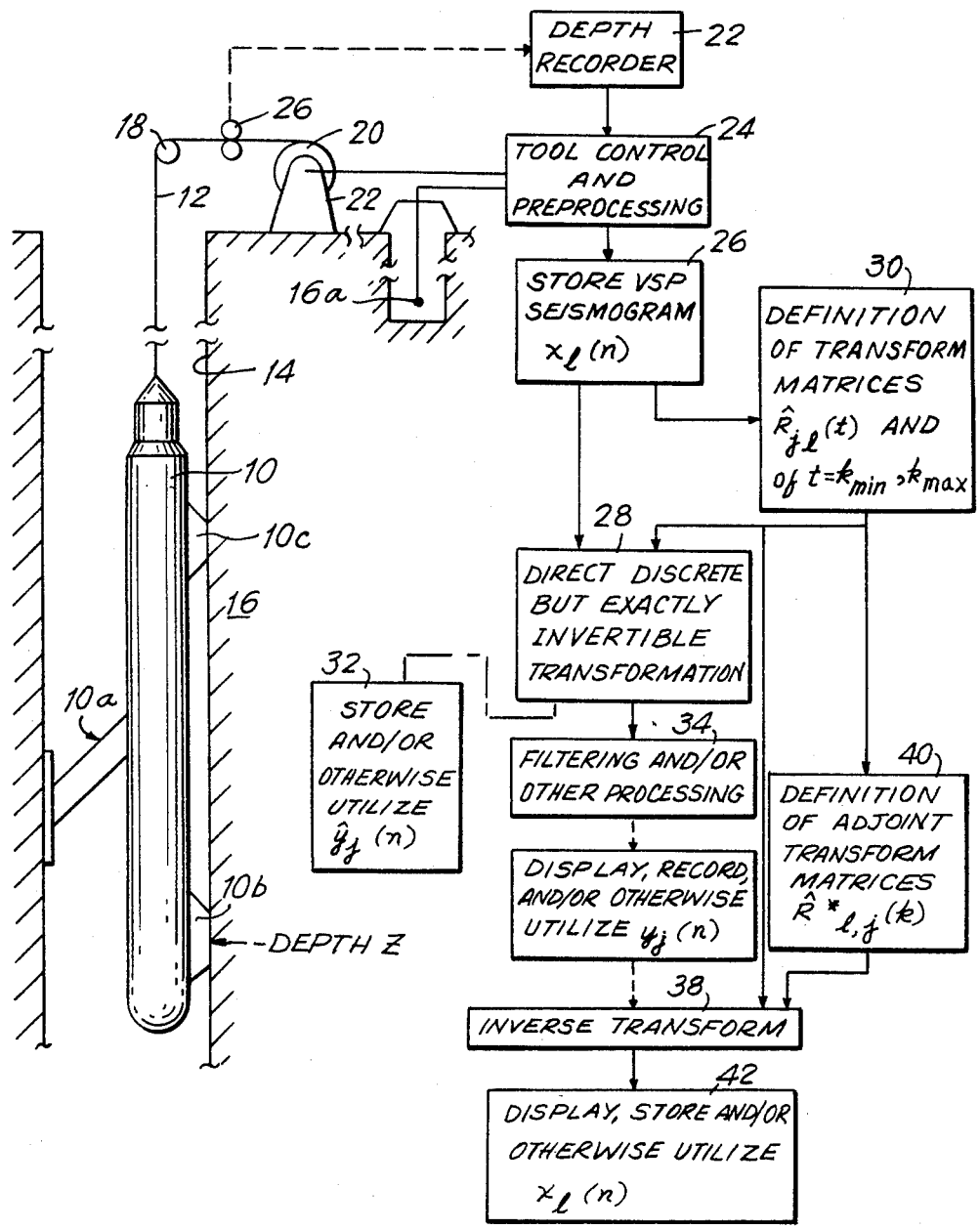
FIG. 1 is a partly schematic and partly block diagram of a system for deriving vertical seismic profiling seismograms, transforming them to tau-p space in which they can be filtered or otherwise processed and inverse-transforming them in accordance with one embodiment of the invention.

Referring to FIG. 1, a tool 10 suitable for VSP exploration is lowered on an armored multiconductor cable 12 into a borehole 14 to take VSP measurements of subsurface formation 16. Tool 10 is adapted for movement up and down borehole 14 and includes a pivoted, power-driven clamping arm arrangement 10a, geophone or receiver pad 10b, another pad 10c, and various internal subsystems. Tools of this type are known; see, for example U.S. Pat. No. 4,527,260. The receivers in pad 10b are clamped against the wall of borehole 14 at borehole depth level z by means of arm 10a, and measure seismic energy originating at a seismic source 16a. These measurements are digitized by circuitry (not shown) in tool 10, and the result is sent up via conductors within armored cable 12. Cable 12 goes to a sheave wheel 18 at the surface, and then to a suitable drum-and-winch mechanism 20 which raises and lowers tool 10 in borehole 14 as desired so that pad 10b can be clamped at a succession of depth levels. Electrical connections between tool 10 and surface equipment are made through suitable multielement slip-ring-and-brush contact assembly 22. A surface unit 24 contains tool control and preprocessing equipment which communicates with tool 10 via cable 12, and with seismic source 16a via another cable. Cable 12 also runs through a measuring wheel unit designated 26 which provides signals indicative of the current borehole depth level z of receiver pad 10b. These depth signals are recorded at unit 28 such that a given set of outputs of the geophones in pad 10b can be associated with a respective depth in the borehole. In a typical operation tool 10, with clamping arm 10a retracted, is lowered to the bottom of borehole 14 (or to the lowest depth level of interest), arm 10 is extended to clamp pad 10b in good acoustic contact with the wall of borehole 14 and a seismic signal is generated at source 16a. The seismic energy measured by the geophones in pad 10b is digitized and set up to unit 24 for any preprocessing, for example to be adjusted to account for tool orientation and seismic energy attenuation with travel time, and to be subjected to any desired prior art processing of VSP signals to generate a VSP seismogram in a discrete form. This seismogram is designated $x_l(n)$ in FIG. 1. In this designation each l identifies a respective one of a total of $(2L+1)$ seismic traces, where $l=0, \pm 1, \ldots, \pm L$, and L is an integer. In the same notation n identifies a time sample of the seismic trace and $n=1, 2, \ldots, N$, where N is an integer. The VSP seismogram can thus be conceptualized as a matrix of time samples of seismic amplitude, where each row is a seismic trace for one spatial position and each column is the set of samples for the same time in all of the seismic traces. The VSP seismogram is stored at 26, e.g., in suitable digital computer storage. In order to allow for a convenient and effective filtering and/or other processing of the seismogram in tau-p space, it is subjected at 28 to a direct transformation which is discrete but exactly invertible, in a process which makes use of transform matrices $R_{jl}(k)$ and defined values of $k_{min}$ and $k_{max}$ which are derived at 30, as described later in this specification. The subscript j identifies a respective one of a total of $(2J+1)$ rows in each transform matrix, where a given row pertains to a given slope in tau-p space and J is an integer and j ranges from $-J$ to $+J$, the index l identifies a respective column in a given matrix, in which there are a total of $(2L+1)$ columns and l ranges from $-L$ to $+L$ and L is an integer, and n identifies a time sample (a cell) of a given transform matrix and n=1, 2, ..., N, where N is an integer. The output of 28 is a seismogram designated $y_j(n)$ which is in tau-p (or slope-intercept) space, where the subscript j and index n have the same meaning as earlier noted in connection with the original VSP seismogram. If desired, the tau-p seismogram can be stored and/or otherwise utilized at 32. At 34 it can be subjected to filtering and/or other processing for the purpose of improving it, e.g. to suppress multiples, or ground roll, or other undesirable effects. The resulting improved seismogram in tau-p space can be displayed, recorded and/or otherwise utilized at 36, if desired. It can be inverse-transformed at 38, for example to return to the space of the original seismogram, using the transform matrices from 30 as well as adjoint transform matrices $R^*_{l,j}(k)$, where the subscripts l and j and the index k have the same meaning as earlier noted. The output of 38 is an improved seismogram which again is represented in the form $x_j(n)$, as was the original seismogram at 26. This improved seismogram can be displayed, stored or otherwise utilized at 42, to help evaluate the subsurface formations for underground resources.

Figure 2:
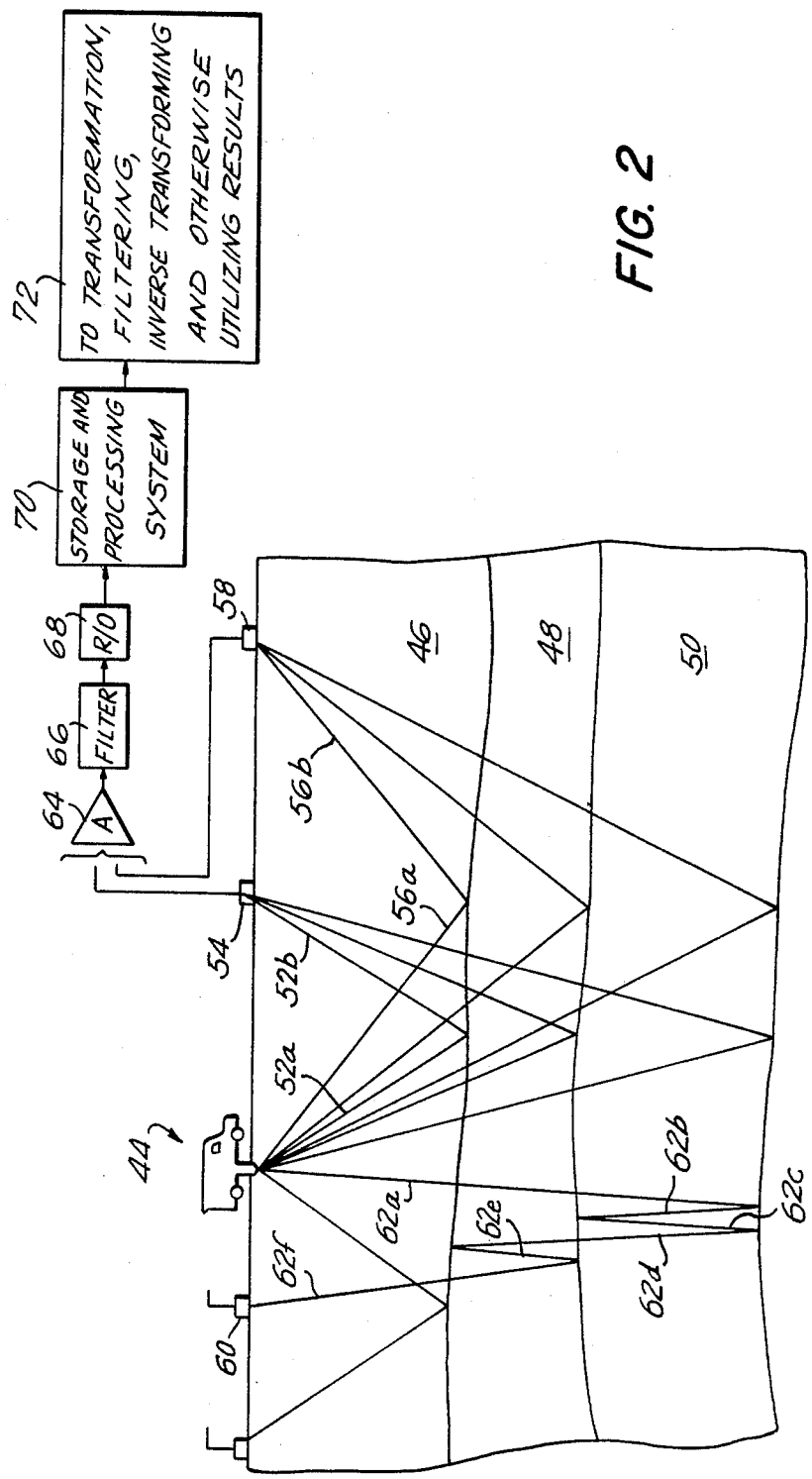
FIG. 2 illustrates in partly schematic and partly block diagram form the derivation of horizontal profiling seismograms and for processing in accordance with an embodiment of the invention.

FIG. 2 illustrates the use of an exemplary embodiment of the invention as used in connection with surface seismics. The source of seismic energy 44 is on the earth's surface, and can be a truck using a vibrator for imparting mechanical vibrations to the earth, or can be any other suitable source of seismic energy. A wave of seismic energy travels downwardly into the surface formations 46, 48 and 50. Several raypaths of this wave are illustrated: raypath 52a propagates downwardly to the interface between layers 46 and 48 and returns back to the surface as reflected raypath 52b (a primary reflection) and is received at a surface receiver or geophone 54; and raypath 56a propagates downwardly to the same reflector and then goes up to detector or receiver 58, but at a different angle of incidence, as reflected raypath 56b (another primary reflection). Similar raypaths are illustrated as going down to the reflectors between layers 58 and 50 and going up to receivers 54 and 58 as primary reflections. In addition, a multiple reflection received at detector 60 is shown: raypath 62a goes down to the reflector at the bottom of layer 50, up as ray 62b, down as ray 62c, up again as ray 62d, down again as ray 62e and up again as ray 62f. For simplicity, the refractions of the ray paths as they go from one layer into another are not illustrated. The outputs of the geophones or receivers can be amplified at one or more amplifiers schematically shown at 64, and can be filtered at one or more filters schematically shown at 66 and digitized at 68 before being sent to a storage and processing system 70. After a suitable number of seismic energy impulses have been imparted to the earth at a particular location and recorded by suitable receivers, the energy source 44 is moved to a new location along the line connecting the initial source and receiver positions, and the receivers can also be moved to a respective new location along the same line. The process can be repeated to get multifold coverage of the subsurface formations of interest. By using a desired level of prior art processing, system 70 can derive a seismogram also represented in the form $x_j(n)$ discussed in connection with 26 in FIG. 1. It can be in the more conventional time-offset space, or can be in depth-offset space or in any other suitable space. The original seismogram derived at 70 is processed at 72, in a manner discussed in connection with 28 through 42 in FIG. 1, to effect transformation, filtering, inverse transformation and utilization of the result, so as to improve the original seismogram and enhance its usefulness for evaluating underground resources.

Figure 3:
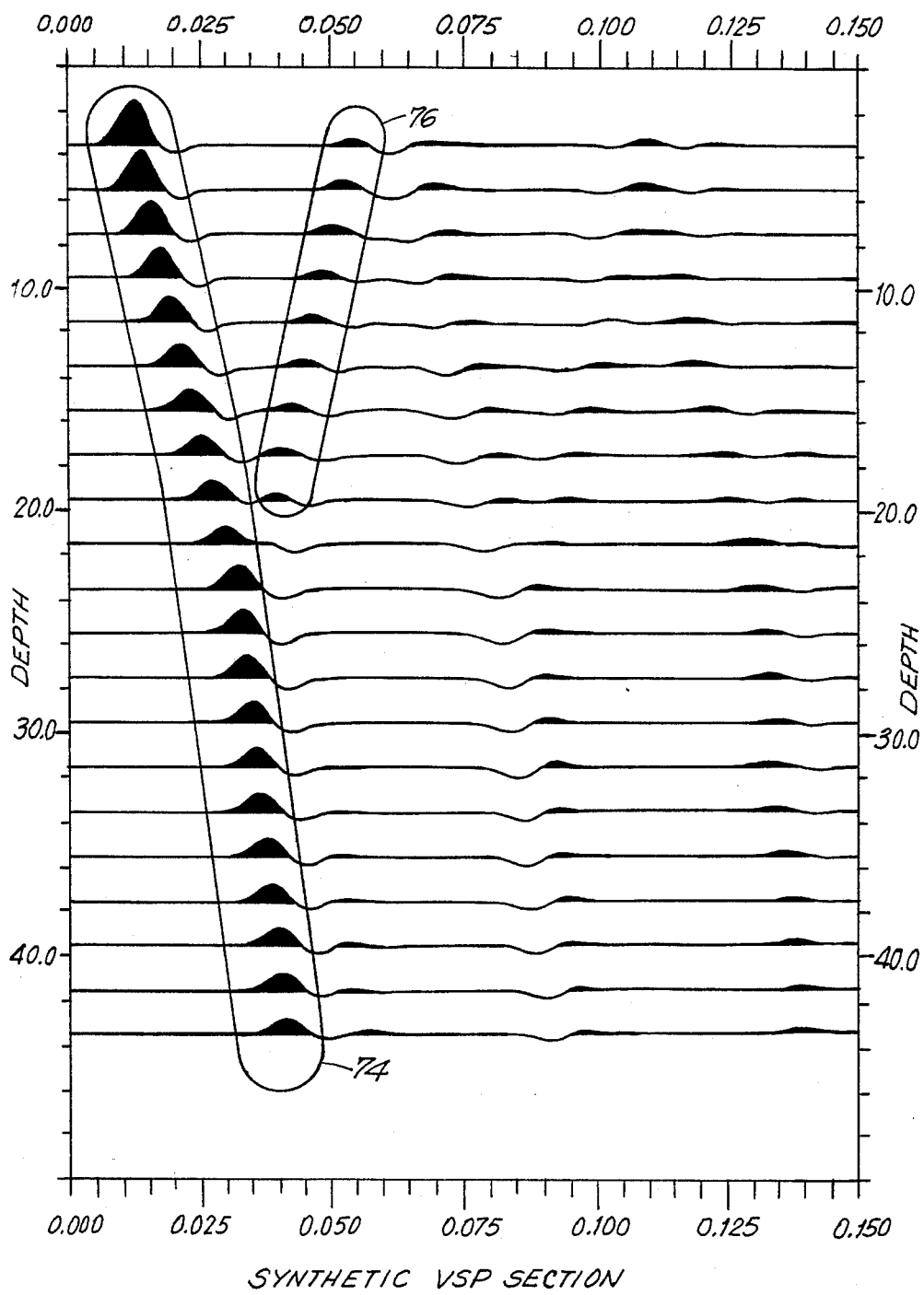
FIG. 3 illustrates a simplified vertical seismic profiling seismogram.
Figure 4:
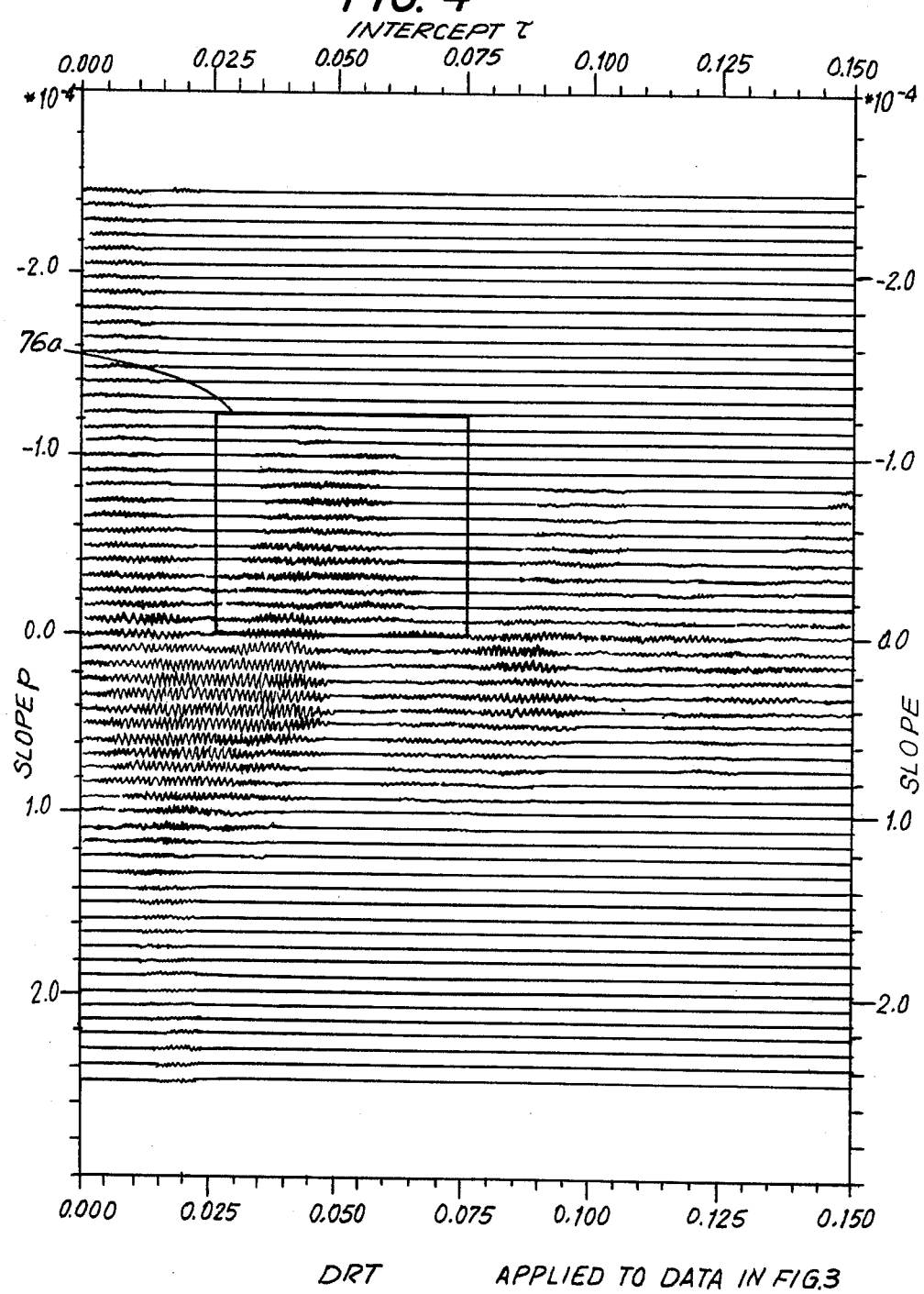
FIG. 4 illustrates the seismogram of FIG. 3 when transformed into tau-p space, with frequency shift, in accordance with an embodiment of the invention.
Figure 5:
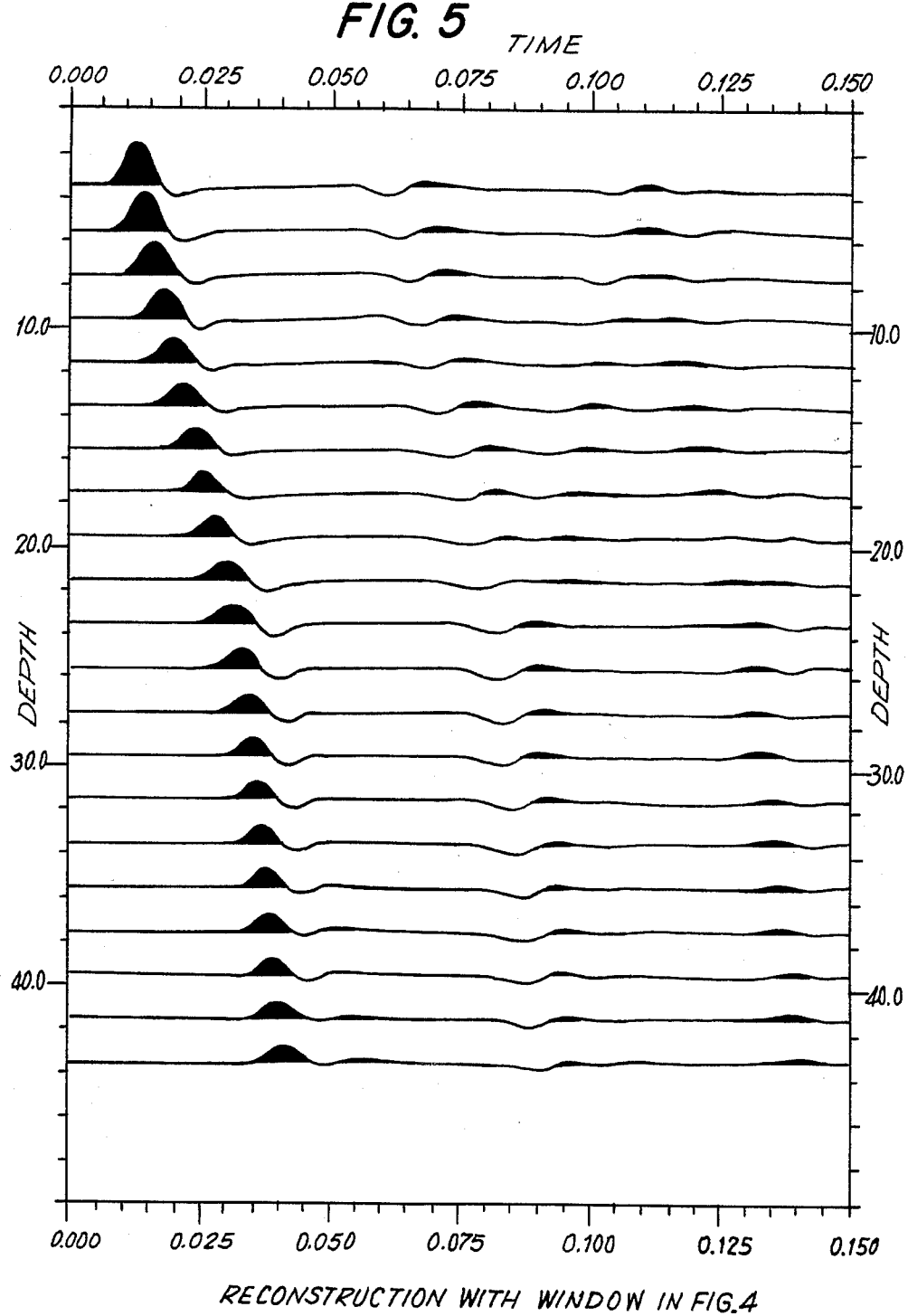
FIG. 5 illustrates the seismogram of FIG. 4 after filtering (by windowing) and inverse-transforming same into time-depth space.

FIGS. 3–5 illustrate an exemplary improvement in a seismogram resulting from the use of an embodiment of the invention. FIG. 3 illustrates a VSP seismogram in time-depth space. In order to illustrate the most relevant features in a simplified manner, the seismogram of FIG. 3 is synthesized. In practice, seismograms of this type tend to be much more complex, and the desirable features tend to be much more obscured by undesirable features such as, at least in some cases, upgoing events, multiples and other noise. In FIG. 3 the horizontal axis is the travel time taken by a seismic signal to travel from the source to a given depth, in seconds, and the vertical axis is depth into the subsurface formations, in feet. For simplicity of illustration, the seismogram of FIG. 3 is represented in continuous form. In practice, each trace is made up of discrete time samples, and the seismogram is in fact represented as rows of time samples, each row being a trace for a given depth. The values of elements of the matrix are depicted in FIG. 3 as darkening of the traces. In the simplified plot of FIG. 3, it can be seen clearly that there is a major downgoing event at 74 and and upgoing event at 76. In many cases it is desirable to separate downgoing from upgoing events, but it may not be possible to do so effectively in time-depth space because in a typical real life seismogram the complexity of the subsurface structures and imperfections of the measuring process may make it impossible or impractical to do such separation accurately. However, such separation can be done effectively, conveniently and accurately in tau-p space.

FIG. 4 illustrates the seismogram of FIG. 3 when transformed to tau-p space by using a discrete transformation in accordance with the invention and by frequency shifting to a higher frequency for ease of illustration and of filtering. Again, while the tau-p space seismogram in FIG. 4 is illustrated for convenience in continuous form, it is in fact in discrete form. The horizontal axis is the tau axis and is labelled intercept and the vertical axis is p and is labelled slope. One important characteristic of seismograms represented in tau-p space, which is particularly relevant to this example, is that in tau-p space the energy of upgoing events appears above the zero line of the p dimension and that of downgoing events appears below that zero line. Accordingly, in tau-p space the seismogram can be filtered and thereby improved by removing upgoing events simply by removing all, or a selected part, of the energy which appears above the zero line of the p dimension. In this particular example, the energy within a window 76a can be removed specifically for the purpose of removing the upgoing event 26 of FIG. 3. This window 76a is selected because along the tau axis it includes the time range of the upgoing event 76. The extent of window 76a up from the p=0 axis is selected simply to include the significant energy apparent in the representation of FIG. 4. Of course, as an alternative, all of the energy appearing in FIG. 4 above the p=0 axis could have been removed, or the energy in some other window could have been removed.

FIG. 5 illustrates the result of an inverse transformation, in accordance with an embodiment of the invention, of the tau-p space seismogram of FIG. 4 after removing the energy within window 76a. The improved seismogram of FIG. 5 is in the same space as the original seismogram of FIG. 3. Again, it is illustrated for convenience in continuous form, although in fact it is in discrete form. A comparison of FIGS. 3 and 5 shows that the upgoing event 76 has been suppressed (indeed removed altogether) to thereby enhance the feature of the original seismogram which in this case is considered desirable, namely the downgoing event 74. As earlier noted, FIG. 3 illustrates a simplified, indeed a simplistic, example, in which it is clear from a visual examination of the figure that event 76 is most likely an upgoing event. However, the invention applies to the much more complex environment of real life seismograms, whether from VSP seismics or reflection seismics. In addition, the invented technique of transforming from a first space into a second space in a manner which allows exact transformation back to the first space within a practical time span, is believed applicable to other kinds of spaces and to other kinds of filtering in the second space, both to seismograms and to other similar records.

Before discussing in detail the invented techniques for an exactly invertible transformation within a practical time span, it may help to conceptualize the nature of tau-p transformations by reference to the illustrations of FIGS. 6a–6c. FIG. 6a shows time-depth space, in which a VSP seismogram such as that of FIG. 3 can be represented, while FIG. 6b is in tau-p space in which a seismogram such as that shown in FIG. 4 can be represented. In the continuous form of the transformation, the integral along a line in time-depth space becomes a point in tau-p space. Thus, the integral along line 78 in FIG. 6a becomes a point 78a in FIG. 6b. The integral along a line 80 in FIG. 6a, which has the same slope in FIG. 6a as line 78, becomes a point 80a in FIG. 6b, which has the same slope (tau) value in FIG. 6b as point 78a. Similarly, the integrals along lines 82 and 84, which are parallel in FIG. 6a, become points 82a and 84a in FIG. 6b, which are on the same tau line. The term integral in this context is used to mean the integral of the energy which appears in the seismogram represented in FIG. 6a along the respective line. The inverse transformation, that is from tau-p space to time-depth space, is illustrated in FIG. 6c. It involves choosing a point in the time-depth space, e.g. a point 86b which happens to have the same location in time-depth space as point 86 in FIG. 6a, and accumulating the contributions to this point 86b from each of the points in FIG. 6b that correspond to lines in FIG. 6a which pass through point 86. In this example, for simplicity point 86 in FIG. 6a was chosen at the intersection of lines 78 and 82 and hence, in FIG. 6c, the reconstructed point 86b receives and accumulates contributions from points 78a and 82a in FIG. 6b. Point 78a of FIG. 6b also makes contributions to all points in FIG. 6c which are along line 78b therein and, similarly, point 82a of FIG. 6b makes respective contributions to all points in FIG. 6c which are along line 82b therein. If FIGS. 6a and 6c are superimposed, line 78 would coincide with line 78b and line 82 would coincide with line 82b. The inverse transformation from a representation such as FIG. 6b to a representation such as in FIG. 6c is sometimes called a backprojection, while the transformation such as from FIG. 6a to FIG. 6b is sometimes called a forward projection.

If the time-depth space is the plane (t,q), the Radon transform of a function u of two variables can be the function Ru defined on a family of straight lines. The value Ru on a given straight line is the integral of u along that line. A line in the plane t,q can be described as $$t = \tau + pq, \quad (1)$$

where $\tau$ and p are parameters. Using terminology adopted in seismic applications $\tau$ is intercept time and p is slope. Thinking of t as a time and q as a spatial variable, the function u(t,q) represents a seismogram. The Radon transform in this case is $$(Ru)(\tau,p) = \int_{-\infty}^{+\infty} u(\tau + pq, q)\,dq, \quad (2)$$

and is known as Tau-P Transform and/or Slant Stack. Radon's inversion formula can be written in operator notations as $$I = R^*KR, \quad (3)$$

where K is a one-dimensional operator (filter) and R* is a dual transform. Given $v(\tau,p) = (Ru)(\tau,p)$, it follows from identity (3) that the original function can be found as $u = R^*Kv$. Here the convolutional operator K is given by $$(Kv)(\tau,p) = \int_{-\infty}^{+\infty} |\omega|\, \nu(\omega,p)\, e^{-2\pi/\omega t}\, d\omega, \quad (4)$$

where $$\nu(\omega,p) = \int_{-\infty}^{+\infty} v(\tau,p)\, e^{2\pi/\omega \tau}\, d\tau. \quad (5)$$

The dual transform R* (which also is the adjoint transform in a proper space of functions) is as follows $$(R^*v)(t,p) = \int_{-\infty}^{+\infty} v(t - pq, p)\, dp, \quad (6)$$

The above notation, and the term integral, refer to a continuous transform of a continuous function (the term "continuous" here means non-discrete), and are discussed here only to help conceptualize rather than describe specifically the process carried out by the invention. As earlier noted, it is believed that the use of the continuous transform is not practical in real life processing of seismograms of complex subsurface formations. One way to conceptualize a prior art attempt to approximate a discrete form of the transformation is to consider the space of FIG. 6a as a matrix of elemental areas, such as pixels, instead of a continuum of points, replace the integration along a line in FIG. 6a by the summation over a strip of a finite width which has the relevant line as its centerline, and consider the space of FIG. 6b also as being made up of elemental areas, such as pixels, instead of a continuum of points. Then, the summation along a strip in FIG. 6a is the addition of the values of matrix elements, with appropriate interpolation if the centerline of a strip does not pass exactly through the center of a pixel which it overlaps. Similarly, the space of FIG. 6c is made up of a matrix of pixels and the inverse transformation (backprojection) comprises accumulating, for a given pixel, contributions from those pixels in FIG. 6b which correspond to strips overlapping the corresponding pixel in FIG. 6a, again with appropriate interpolation to take into account the degree of overlap between a respective pixel in FIG. 6a and the strip in question.

It is seen from this conceptualization that in the inversion from tau-p space to the space of the original seismogram each trace in tau-p space affects all of the traces in the space of the original seismogram, and that in order to reconstruct one pixel in time-offset space information from all pixels in tau-p space must be used. The processing time becomes prohibitive if higher accuracy is needed.

Figure 7:
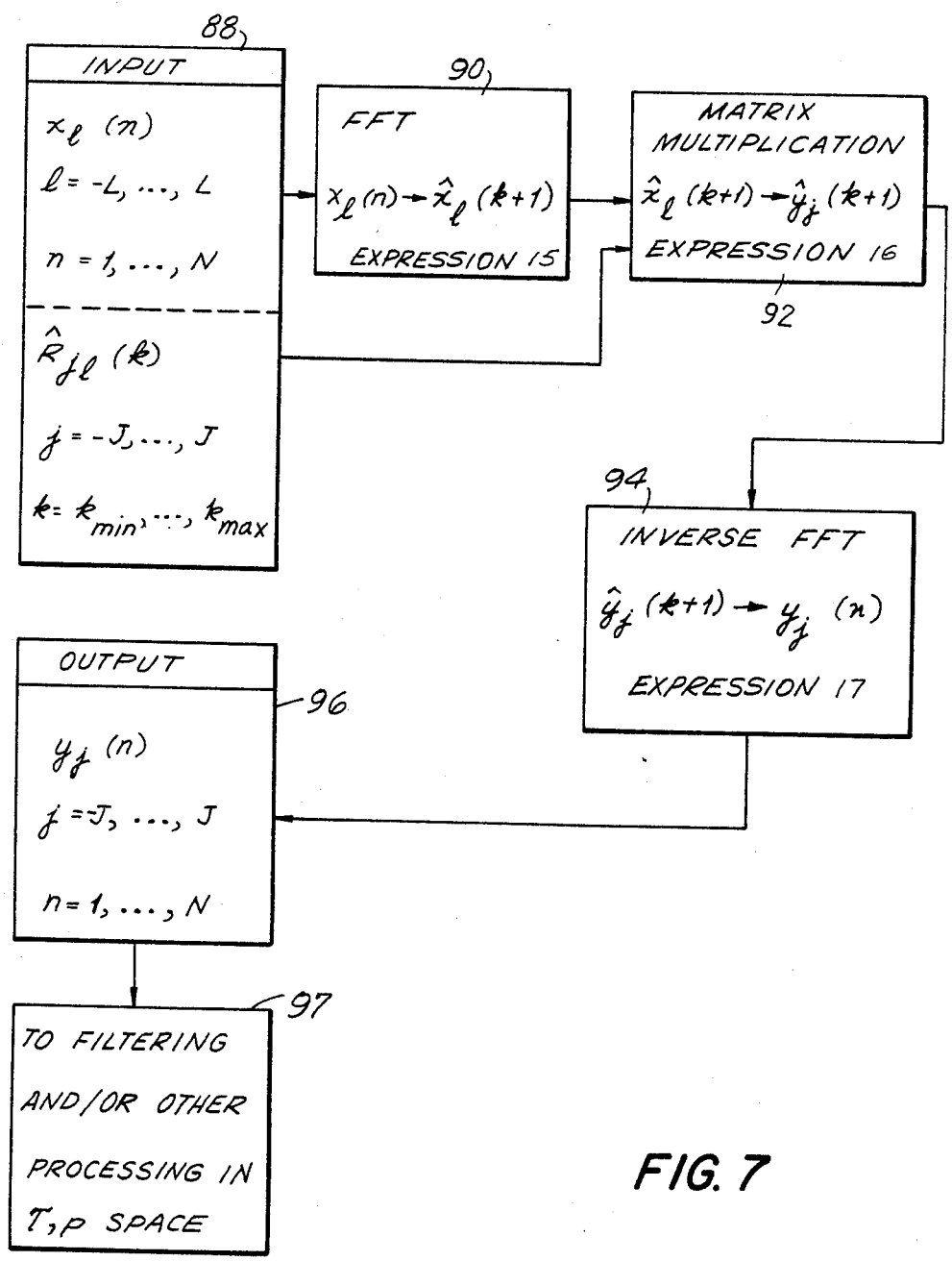
FIG. 7 is a block diagram illustrating in greater detail the transformation of a seismogram to tau-p space in accordance with an embodiment of the invention.

A specific and nonlimiting embodiment of the portion of the invention concerned with making an exactly invertible transformation from a space such as in FIG. 6a to a space such as in FIG. 6b within a practical span of time is illustrated in FIG. 7. In general, it involves starting with a seismogram which can be represented as a two-dimensional array of values of a seismic parameter, and with transformation matrices which can be derived as discussed in connection with FIG. 9, transforming the array to frequency space, matrix-multiplying it with the transformation matrices to derive respective product arrays for the respective frequencies, and inverse transforming the product arrays out of frequency space to form the desired tau-p version of the original seismogram. One important characteristic of the original seismogram array is that it is processed as periodic, within period N. If it does not originally have that characteristic, it can be created by stuffing appropriate columns with zero values. Another important characteristic of the process is that the transformation matrix is block circulant if represented in the spatial domain. A consequence of this is that in the spatial domain only a single row of blocks of one matrix at most need be stored and all other needed rows derived by simple recirculation. In the frequency space a consequence of this is that all seismic data for a given frequency can be processed, independent of the other frequencies, with savings in processing times in orders of magnitude as compared with known prior art discrete tau-p processes.

Referring to FIG. 7, the inputs to the process at step 88 are an original seismogram $x_i(n)$ and transformation matrices $\hat{R}_{ji}(k)$. The original seismogram can be considered a two-dimensional array where, for a fixed index 1 the array row represents a discrete signal which can be called a time series or a seismic trace. An odd number of traces (2L+1) is chosen for convenience. For a fixed time point n (also called a sample or time sample point) $x(n)$ denotes the vector sequence:

$$x(n) = \begin{vmatrix} X_{-L}(n) \\ \vdots \\ X_0(n) \\ \vdots \\ X_L(n) \end{vmatrix} \quad (7)$$

where the vector sequence x(n) is defined for all integers n from 1 to N and is a periodic vector sequence with the period N such that:

$$(i) x(n+N) = x(n). \quad (8)$$

If for a particular seismogram the vector sequence x(n) is not a periodic vector sequence with the period N, it is made into such a sequence by padding it with zero elements as needed.

The tranformation matrices $R_{ji}(k)$ have the important property that their spatial domain versions $R_m$ form a block-circulant transformation matrix of the form:

$$R = \begin{pmatrix} R_0 & R_1 & \ldots & R_M & R_{-M} & \ldots & R_{-1} \\ R_{-1} & & & & & & \vdots \\ \vdots & & & & & & R_{-M} \\ R_{-M} & & & & & & R_M \\ R_M & & & & & & \vdots \\ \vdots & & & & & & R_1 \\ R_1 & \ldots & R_M & R_{-M} & \ldots & R_{-1} & R_0 \end{pmatrix} \quad (9)$$

and have adjoint transformation matrices $R^*_{ji}(k)$ whose spatial domain versions $R^*_m$ also form a block-circulant matrix of the form:

$$R^* = \begin{pmatrix} R_0^* & R_{-1}^* & \ldots & R_{-M}^* & R_M^* & \ldots & R_1^* \\ R_1^* & & & & & & \vdots \\ \vdots & & & & & & R_M^* \\ R_M^* & & & & & & R_{-M}^* \\ R_{-M}^* & & & & & & R_{-1}^* \\ \vdots & & & & & & \vdots \\ R_{-1}^* & \ldots & R_{-M}^* & R_M^* & \ldots & R_1^* & R_0^* \end{pmatrix} \quad (10)$$

The transformation matrices $R_{ji}(k)$ are related to their spatial domain versions in accordance with $$\hat{R}(k) = \sum_{m=-M}^{m=M} R_m e^{-2\pi i \frac{mk}{N}}. \quad (11)$$

It can be sufficient to consider matrices R(k) only for K=0, 1, ..., N/2, in which case the expression immediately above reduces to:

$$\hat{R}_m = \frac{1}{N} \sum_{k=0}^{k=N-1} R(k) e^{2\pi i \frac{mk}{N}}. \quad (12)$$

If, for example:

$$\hat{R}_N(k) = e^{-2\pi i \sigma \frac{Nk}{N}}. \quad (13)$$

It follows from (12) that if $\sigma = 1$ matrices $R_m$ are given by $$(R_m)_{jl} = \delta_{m,jl} \quad (14)$$

and their adjoint matrices $\hat{R}^*_{ji}(k)$ are similarly related to the spacial domain version $\hat{R}^*_m$. However, as discussed below, the transform matrices $\hat{R}_{ji}(k)$ need not be derived from the matrices $R_m$ which form the block-circulant matrix R of equation (9).

Figure 8:
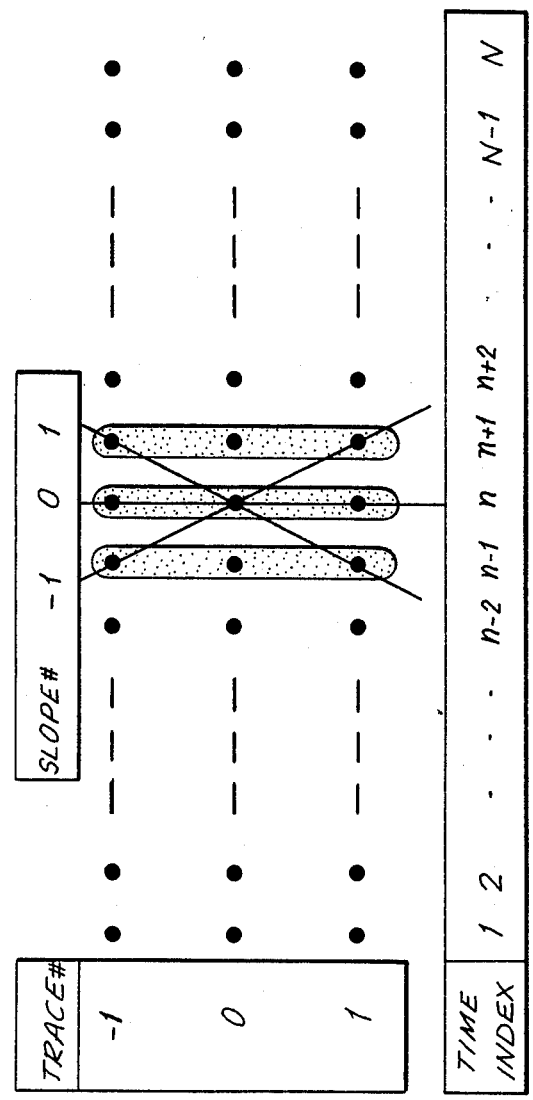
FIG. 8 illustrates three rows of a matrix representation of a seismogram and several slopes.

Referring to FIG. 8 for an illustration of the process of FIG. 7, three "traces" of the two-dimensional seismic array $x_l(n)$ are illustrated. Each trace is identified by a respective index l; in FIG. 8 the three traces, or rows of the array, are identified by respective indices $l = -1, 0, 1$. Each column of the array in FIG. 8 is identified by a respective time index n, and each point in the matrix illustrates an array element. An array element can be a time sample of a seismic trace represented in discrete form. As indicated at 88 in FIG. 7, the row index l ranges from $-L$ to $+L$ and the time sample index n ranges from 1 to N, and each of L and N is an integer.

The transformation matrices $\hat{R}_{jl}(k)$ comprise another input to process step 88 in FIG. 7. The index j identifies a respective slope and ranges from $-J$ to $+J$, such that there are a total of $(2J+L)$ slopes, each corresponding to a row in a transformation matrix, and the index l is the same as discussed earlier, except that this time it identifies a column in a transformation matrix. The index k identifies a respective Fourier space frequency. Thus, there is a respective transformation matrix for each respective frequency of interest. The frequencies of interest range from a minimum to a maximum frequency selected for a particular transformation. A technique for deriving suitable minimum and maximum values of the frequency k is discussed in connection with FIG. 9.

At process step 90 in FIG. 7, the original seismogram is transformed into frequency space, e.g., in accordance with the relationship:

$$\hat{x}(k+1) = \sum_{s=1}^{a=N} X(n) e^{2\pi i \frac{(a-1)k}{N}}, \quad (15)$$

by using, for example, equipment implementing a discrete Fourier transformation (DFT) process, such as commercially available dedicated FFT processors or by using a suitably programmed general purpose digital computer carrying out a known type of DFT (e.g., FFT) processing. The result of 90 is an array $\hat{x}_l(k+1)$ which has the same number of rows as the array $x_l(n)$, each identified by a respective subscript l, and has columns each identified by the index $(k+1)$, where k is a frequency and ranges between the minimum and maximum values input at 88.

Note that at this time each row of the array $\hat{x}_l(k+1)$ is the frequency space version of a corresponding row of the array $x_l(n)$, i.e., it is the frequency space version of a respective seismic trace.

In order to move further toward transforming the original seismic array into a tau-p space array, at 92 the frequency space version of the original seismogram is multiplied by the transformation matrices which were input at process stepp 88, in an operation which can be defined as:

$$\hat{y}(k+1) = \hat{R}(k)\hat{x}(k+1),$$

for $k = 0, 1, \ldots N-1$, where $\hat{y}(k+1)$ and $\hat{x}(k+1)$ are DFT's of $y(n)$ and $x(n)$ respectively.

The multiplication is over the index k, i.e., the transformation matrix which is for a given frequency k multiplies the array to derive a respective product array for that frequency, then the transformation matrix for another frequency k multiplies the array to derive another respective product array for the new frequency k, etc.

Here j and k have the values discussed in connection with the transformation matrix of 88. The matrix multiplication can be carried out by equipment such as dedicated digital processing devices or by a suitably programmed general purpose digital computer.

As a final step to arrive at the desired seismogram in tau-p space, the product arrays resulting from 92 are inverse-transformed at 94, out of frequency space, for example by an inverse-DFT process such as the inverse-FFT process described by the expression:

$$\hat{y}(n) = (1/N) \sum_{k=0}^{N-1} \hat{y}(k+1) e^{-2\pi i (n-1)(k/N)} \text{ for } n = 1, \ldots, N \quad (17)$$

using equipment such as commercially available inverse-FFT devices or using a suitably programmed general purpose digital computer.

The output at 94 is the desired tau-p space seismogram, which is in discrete form, represented as the array $y_j(n)$, where the subscripts j identify respective rows of the array and have the same values as discussed in connection with 88, while the indices n identify respective columns of the array and have the same values as discussed in connection with 88. In one form of a seismogram in tau-p space, it is common to refer to j as representing slope p and the index n as representing intercept tau. A unique property of the transformation illustrated in FIG. 7 is that although in discrete form, it is exactly invertible within a practical time span, in that the seismogram of 96 can be inverted exactly into the seismogram of 88 well within the limitations of the digital computing equipment used for the purpose, and within a practical span of time for the typical amount of data from a seismic survey.

Figure 9:
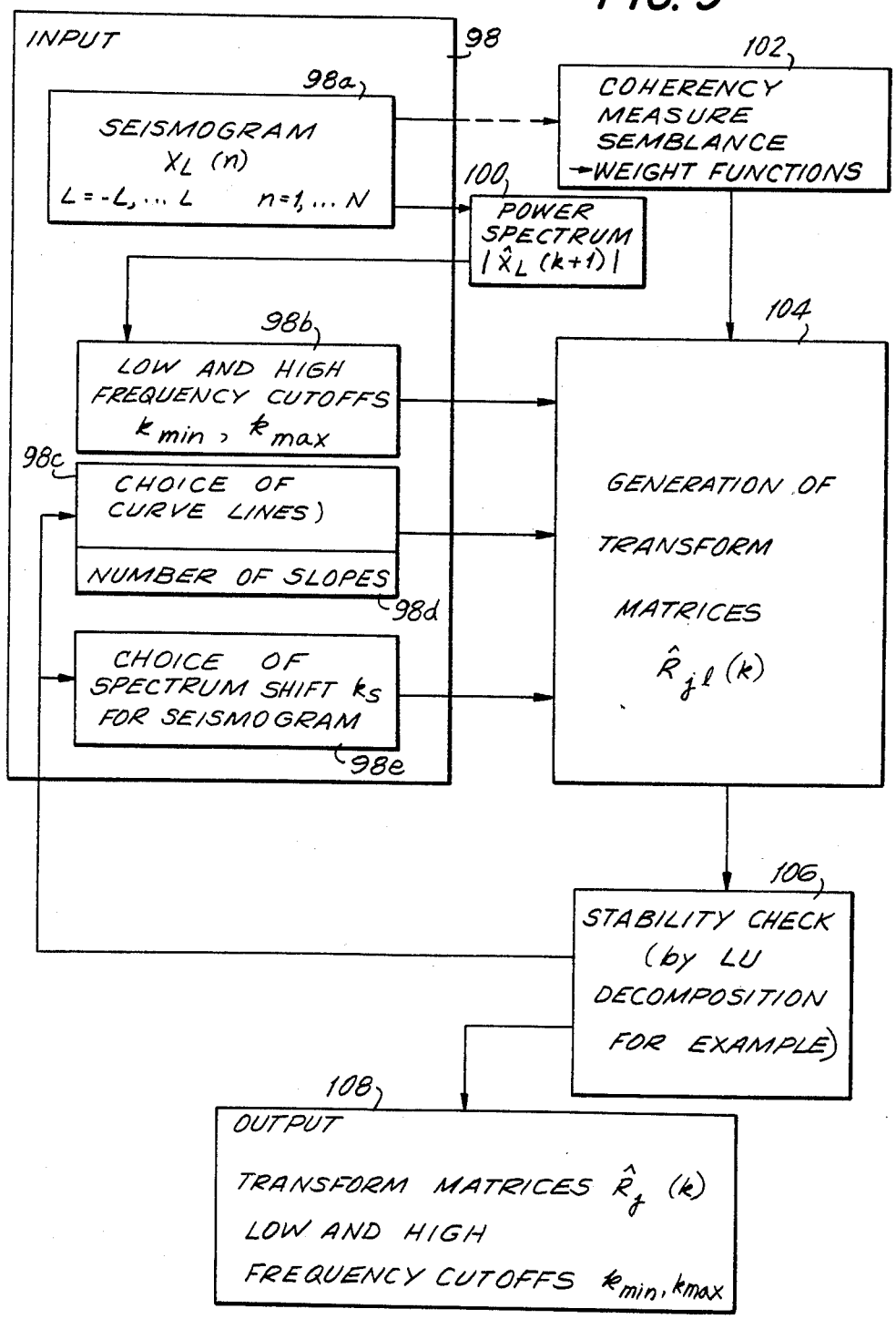
FIG. 9 illustrates in block diagram form the derivation of transform matrices and minimum and maximum frequency values in accordance with an embodiment of the invention.

FIG. 9 illustrates a technique for deriving the transformation matrices discussed in connection with 88 and 92 in FIG. 7. The inputs to the procedure are indicated at 98 and comprise the original seismic array at 98a and the minimum and maximum cutoff values of the frequency index k at 98b. Another input at 98c is a choice of curves or slopes. One choice is straight lines, as illustrated in FIG. 6a. Another choice is curved lines, and may be appropriate if the features of greatest interest in the original seismogram happen to be along curved rather than straight lines. Another choice, which can be made at 98c, is the portion of the original seismogram to be included between the minimum and maximum slopes to be used. Another input is indicated at 98d and is the number of slopes. This is the number $(2J+1)$ discussed earlier. If a greater number of slopes is chosen, it is more likely that the transformation from the original seismogram to tau-p space and back to the space of the original seismogram, would be more stable but, of course, this would involve a greater number of computational steps. Lastly, the input includes a spectrum shift choice at 98e. If the frequency spectrum of the original seismogram is low, it is less likely that a stable transformation into and out of tau-p space can be made. Therefore, for original seismograms of relatively low frequency spectrum it may be desirable to carry out a spectrum shift first (to a higher frequency spectrum) to make the transformations more stable. This spectrum shift can be incorporated in the transformation, as in equation (18) below.

The process illustrated in FIG. 9 is to a certain extent iterative and interactive. The initial choice for the minimum and maximum cutoff frequencies at 98b can be derived from examining at 100 the power spectrum of the original seismogram. For example, the absolute value of the frequency space transform of the original seismogram can be derived at process step 100, and can be examined to see what frequencies predominate. The boundaries of the frequency concentration of likely interest can be chosen as the minimum and maximum cutoff frequencies for use at 98b. For process step 98c, the simplest choice is straight lines. The original seismogram can be examined to see what slopes of events of likely interest can be seen, and the two extreme slopes can be chosen so as to include the features of probable interest.

If desired, another input can be defined at 102 as a coherency measure such as semblance, to be used to provide a weighting function. The energy of coherency in the original seismogram can be measured, using known techniques, and projected on selected slopes. For example, weighting functions can be chosen to emphasize slopes which have high coherent energy and de-emphasize slopes which have low coherent energy. The term coherent energy is used here to refer to the energy of the original seismogram, and the term slope is used in this context to refer to the slopes 1 discussed earlier.

With the available input parameters, a set of transform matrices is generated at 104, e.g., in accordance with the relationship:

$$\hat{R}_N(k) = e^{-2\pi i \sigma \frac{N(k+k_3)}{N}}, \quad (18)$$

In the above relationship the frequency k ranges from the minimum to the maximum cutoff values specified at 98b and the spectrum shift of 98e is specified as $k_s$. The parameter sigma can be:

$$\sigma = \frac{N}{(2J+1)k_g}. \quad (19)$$

The parameter sigma can be conceptualized as the number of slopes for a time step and can help avoid the use of interpolation.

Another, more generalized choice of matrices $\hat{R}_{ji}(k)$ is as follows, where the amplitudes A(j,l) and the phase function $\phi(j,l)$ can be pre-stored:

$$\hat{R}_{ji}(k) = A(j,l)e^{-2\pi i \phi(j,l)\frac{k}{N}}, \quad (20)$$

and an even more generalized choice is:

$$\hat{R}_{ji}(k) = A\left(j,l,\frac{k}{N}\right)e^{-2\pi i \phi(j,l,\frac{k}{N})}, \quad (21)$$

The transform matrices generated at 104 can be tested for stablilty at 106, for example by the known technique of LU decomposition (lower and upper triangular matrices decomposition). This decomposition gives a condition number which can serve as an indication of how stable the inversion will be of a tau-p matrix derived from the transformation process of FIG. 7 when using the transform matrices derived at 104 in FIG. 9. For inversion approaching absolute stablility the condition number approaches one; for inversion approaching impossibility to ivert the condition number approaches zero. The stablility check in accordance with the invention can involve requiring that the condition numbers for all frequencies k between the minimum and maximum values of k are compatible, i.e., all are within the same order of magnitude. This must be true for all, or at least a great majority of frequencies k.

If the stability check at 106 indicates that the stability threshold is not met, e.g., that the condition numbers for the frequencies within the range specified at 98 significantly differ in that many are outside the same order of magnitude, the input conditions can be modified. For example, as a first choice the number of slopes at 98d can be increased, and the procedure repeated through the stability check at 106. If the stability check still is unsatisfactory, the spectrum shift 98e can be moved to a higher level and the procedure again repeated. If the stability check is still unsatisfactory, the span 98c can be increased to encompass more of the original seismogram. When the stability check at 106 is satisfactory, the minimum and maximum frequencies k, and the transform matrices, are made available at 108 for use as inputs at 88 in FIG. 7.

Once the seismogram in tau-p space (output at 96 in FIG. 7) is available, it can be filtered and/or otherwise processed in tau-p space to thereby generate an improved tau-p space seismogram. One example of such filtering or processing is illustrated in FIGS. 3-5. It involves separation of an upgoing event in tau-p space so that it is suppressed in the inverse-transformed seismogram. Another example is separation of P-waves and mode-converted S-waves through filtering in tau-p space. These and other types of filtering or processing in tau-p space are known in the prior art, and need not be described in detail here. For example, in separation of P-waves and S-waves, use may be made of the facts that at angles less than a critical angle P-waves predominate, and in tau-p space each p corresponds to a known angle of incidence at the surface. If the portion of the seismogram in the tau-p space which corresponds to angles of incidence greater than the critical angle is eliminated, the inverse-transformed seismogram is likely to be constrained to events associated with P-waves. Subtracting such an inverse-transformed seismogram from the original seismogram should result in emphasizing events associated with S-waves.

Figure 10:
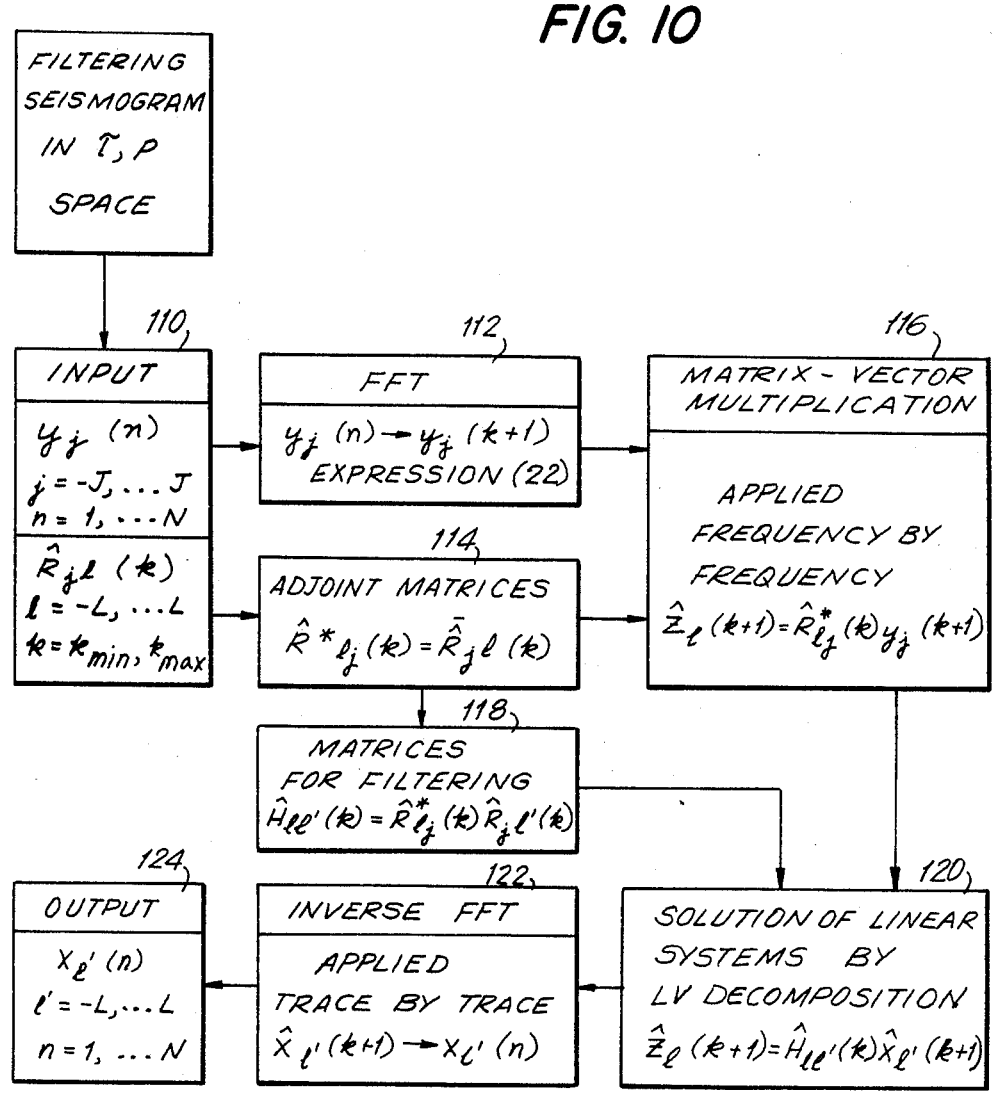
FIG. 10 illustrates in block diagram form an inverse-transformation in accordance with an embodiment of the invention.

FIG. 10 illustrates a process in accordance with an embodiment of the invention for inverse-transforming a seismogram which has been filtered or otherwise processed in tau-p space to improve it. An important characteristic of this process is that the processing is frequency-by-frequency, i.e., all processing for a given frequency k can be completed independently of the results of processing for other frequencies. Thus, unlike the case of known discetized inversion processes, no large matrices need to stored and accurate inversion can be achieved within practical processing times.

Referring to FIG. 10, the input at process step 110 is the improved seismogram in tau-p space and the same transformation matrices which were used in the process of FIG. 7. The improved seismogram is designated $y_j(n)$, just as at the output at 96 in FIG. 7, but it should be clear that in FIG. 10 the seismogram $y_j(n)$ is that resulting from filtering or otherwise transforming the seismogram of 96 for the purpose of improving it. The seismogram at 110 is in the same format, or can be in the same format, as that at 96 in FIG. 7. At 112 the modified seismogram from 110 is transformed to the frequency domain, which can be done by the same DFT (or FFT)

technique and the same type of equipment as at 90 in FIG. 7, in accordance with the relationship:

$$\hat{y}(k+l) = \sum_{n=1}^{n=N} y(n) e^{2\pi i \frac{(n-1)k}{N}}, \quad (22)$$

At process step 114 the adjoint matrices are generated from the transform matrices, as mirror images of the transform matrices, with complex conjugation on the basis of the relationship stated in the block 114 in FIG. 10. At process step 116 the matrix multiplication indicated at block 116 in FIG. 10 takes place, in which the frequency space version of the modified seismogram is multiplied by the adjoint matrices generated at 114 to derive the indicated product arrays. In order to proceed further with the inversion, at process step 118 matrices for filtering are generated by matrix-multiplying the transformation matrices from 110 and the adjoint matrices from 114 in the manner specified by the expression in block 118 of FIG. 10. At process step 120 the linear system of relationship specified in block 120 of FIG. 10 is solved for the array $x_l(k+1)$, e.g., by LU decomposition using inputs from process steps 116 and 118. In order to carry out the final step of inverse-transforming the improved seismogram, at process step 122 the result of step 120 is inverse-transformed from frequency space to the spatial domain, e.g., using the technique and equipment of the type used at process step 94 in FIG. 7, to derive an improved seismogram which is in the same space as the original seismogram of 88 in FIG. 7. This improved seismogram is output at 124 for utilization as discussed above.

The embodiment of the invention discussed in detail above involves using the transformation matrices and their adjoint matrices in the frequency domain. In the structure which the invention affords, they are used in a way which makes it possible to carry out the processing of seismic data for one frequency independently of the other frequencies. As another embodiment, a similar process can be carried out partly or entirely in the spatial domain, by using the spatial domain version of the transformation matrix and its adjoint matrix. In that case, they have the important characteristic of being block-circulant, which avoids the prior art difficulties of storing and manipulating large matrices. Of course, as is well known in the art, the process steps described above as carried out in the frequency domain would have to be converted to the corresponding process steps for the spatial domain.

Thus, one aspect of the invention is that it provides a structure in which the forward discrete transformation into tau-p space is done in a way which permits discrete inverse-transformation which in processing in the frequency domain can be completed independently by frequency and in processing in the spatial domain can utilize the block-circulant structure of the transformation matrix. Another aspect is that if the relevant process is carried out in the spatial domain, the block-circulant structure of the transform matrix in that domain can be used to advantage to drastically reduce storage requirements and increase speed as compared to known prior art techniques. Thus, for example, one row of blocks of the matrix in equation (9) could be stored instead of the whole matrix. Transforms would be performed using the vector x(n) of equation (7) and these blocks, starting at each successive step with a different respective block in the sequence of stored blocks. This can be achieved, for example, by using known techniques for convolution in the spatial domain, appropriately extended to manipulate blocks of numbers instead of individual numbers. Yet another aspect of the invention is that the disclosed process to accomplish an exactly invertible transformation in tau-p space, or an equivalent space, can be applied to great advantage to seismic measurements as well as to other measurements of parameters of media which can benefit from such techniques. It is also envisaged that the methods disclosed herein are applicable to other data, for example in the recognition of characters in lines of text or in other kinds of image processing.

I claim:

1. A method of seismic exploration of subsurface formations comprising:
    deriving a first seismogram of selected subsurface formations;
    transforming said first seismogram to tau-p space through a discrete transformation process which permits exact discrete inverse-transformation and which in processing in the frequency domain can be completed frequency-by-frequency and in processing in the spatial domain can utilize a transformation matrix having a block-circulant structure;
    processing the tau-p space seismogram to enhance desirable features thereof and effect an exact discrete inverse transformation from tau-p space to generate an improved seismogram; and
    providing a tangible representation of the improved seismogram.

2. A method as in claim 1 in which said processing comprises processing the tau-p space seismogram to enhance desirable features thereof and thereby generate an improved tau-p space seismogram, and inverse-transforming said improved tau-p space seismogram using an exact discrete inverse transformation to generate said improved seismogram.

3. A method as in claim 2 including the step of providing a tangible representation of said improved tau-p space seismogram.

4. A method as in claim 1 including the step of performing a spectrum shift upon said first seismogram.

5. A method as in claim 4 in which said spectrum shift is incorporated in said transformation.

6. A method as in claim 1 in which the tangible representation of the improved seismogram is in the form of a visible display thereof.

7. A method as in claim 1 in which the inverse transformation transforms the improved tau-p space seismogram from tau-p space to the space in which said first seismogram was represented prior to its transformation into tau-p space.

8. A method as in claim 1 in which the transforming step comprises a transformation in which selected combinations of traces of said first seismogram and slopes of said tau-p space seismogram are weighted to enhance or suppress the effect of the corresponding portion of the tau-p space seismogram.

9. A method as in claim 1 in which the deriving step comprises deriving said first seismogram in time-offset space.

10. A method as in claim 1 in which the deriving step comprises deriving said first seismogram in time-depth space.

11. A method as in claim 1 in which the transforming step comprises a transformation in which selected curves of said first seismogram transform to points in tau-p space.

12. A method as in claim 11 in which said selected curves of said first seismogram are nonlinear.

13. A method of seismic exploration of subsurface formations comprising:
deriving a seismogram of subsurface formations which is in discrete form in a selected space;
transforming the seismogram through the use of a discrete form of a transform to generate a seismogram in tau-p space, in a process which comprises utilizing a transformation matrix having the property of being block circulant when represented in the spatial domain;
filtering the seismogram in tau-p space to generate a filtered seismogram;
inverse-transforming the filtered seismogram from tau-p space through the use of an exact discrete form of an inverse transform to thereby generate a filtered seismogram in the selected space; and
providing a tangible representation of the filtered seismogram in the selected space.

14. A method as in claim 13 in which said tangible representation is in the form of a visible display.

15. A method as in claim 13 in which the transforming step comprises a transformation in which selected combinations of traces of the seismogram which is in said selected space and slopes of the seismogram in tau-p space are weighted to enhance or suppress the effect of the corresponding portion of the tau-p seismogram.

16. A method as in claim 13 in which the transforming step comprises a transformation in which selected curves of the seismogram which is in said selected space transform to points in tau-p space.

17. A method as in claim 16 in which said selected curves are nonlinear.

18. A method of seismic exploration of subsurface formations comprising:
deriving an original seismogram of selected subsurface formations which is represented as a set of traces each comprising discrete samples of a selected seismic parameter over time for a selected spatial parameter;
transforming the original seismogram into tau-p space by transforming the original seismogram into the frequency domain, multiplying the frequency domain version of the original seismogram by selected transformation matrices for respective frequencies to derive respective product arrays, and inverse transforming the product arrays out of the frequency domain to derive a representation of the original seismogram in discrete form in tau-p space and allowing exact discrete inverse-transformation; and
providing a tangible representation of the seismogram in tau-p space in form suitable for modifying or display in tau-p space.

19. A method as in claim 18 including modifying the seismogram in tau-p space to thereby derive a modified seismogram in tau-p space.

20. A method as in claim 19 including transforming the modified seismogram into the frequency domain, multiplying the frequency domain version of the modified seismogram by the adjoint matrices of said transformation matrices to derive respective adjoint product arrays, using the adjoint matrices and the transformation matrices to derive selected matrices for filtering, solving for the array a linear relationship between the array and adjoint product arrays and said matrices for filtering, and inverse-transforming the last recited array out of frequency space to thereby generate a seismogram of said selected subsurface formations which corresponds to said modified seismogram in tau-p space but is represented as a set of traces each comprising discrete samples of a selected seismic parameter over time.

21. A method as in claim 18 including weighting selected combinations of traces of the original seismogram and slopes of the seismogram in tau-p space to enhance or suppress the effect of the corresponding portion of the tau-p seismogram.

22. A method as in claim 18 in which the transforming step comprises a transformation in which selected curves of the original seismogram transform to points in tau-p space.

23. A method as in claim 22 in which said selected curves are nonlinear.

24. A method comprising:
deriving a two-dimensional array $x_l(n)$ of seismic traces in (l,n) space, where l is an integer index which identifies a respective one of (2L+1) traces which are rows in the array and ranges from $-L$ to $+L$, L being an integer, each row of the array comprises discrete samples of a selected seismic parameter, each sample being identified by an index $n = 1, 2, \ldots, N$, and $x(n)$ is a periodic sequence with the period N, N being an integer;
deriving transformation matrices $\hat{R}_{jl}(k)$, where j is an integer index which identifies a respective one of (2J+1) rows of a transform matrix and ranges from $-J$ to $+J$, l is an integer index which identifies a respective one of (2L+1) columns of a transformation matrix and ranges from $-L$ to $+L$, and where k is a frequency index and J and L are integers;
transforming the array $x_l(n)$ into the frequency domain to derive the array $\hat{x}_l(k+1)$;
matrix-multiplying the array $\hat{x}_l(k+1)$ by the matrices $\hat{R}_{jl}(k)$ to derive the array $\hat{y}_j(k+1)$ allowing exact discrete inverse-transformation; and
modifying the array $\hat{y}_j(k+1)$ to derive a modified array.

25. A method as in claim 24 in which the transformation matrices $\hat{R}_{jl}(k)$ are at least in part a function of the array $x_l(n)$ and have the property of having a block-circulant structure when represented in the spatial domain.

26. A method as in claim 24 in which the modifying step comprises inverse-transforming the array $\hat{y}_j(k+1)$ out of frequency space to derive the array $y_j(n)$ and to represent it as a seismogram in (j,n) space allowing exact discrete inverse-transformation, and modifying the array $y_j(n)$ to derive a modified seismogram.

27. A method as in claim 24 including:
matrix-multiplying the modified array $\hat{y}_j(k+1)$ with adjoints of said transformation matrices to generate an array $\hat{z}_l(k+1)$;
generating matrices $\hat{H}_{ll'}(k)$ by matrix multiplying said transform and adjoint matrices, where l' is an integer index and ranges from $-L$ to L, L being an integer;
solving the systems $\hat{z}_l(k+1) = \hat{H}_{ll'}(k)\hat{x}_{l'}(k+1)$ for the array $\hat{x}_{l'}(k+1)$, wherein said systems are linear; and
inverse-transforming the array $\hat{x}_{l'}(k+1)$ out of the frequency domain and into (l',n) space to derive a modified array $x_{l'}(n)$ and to represent same as a modified seismogram in (l',n) space.

28. A method as in claim 21 wherein the modifying step comprises inverse-transforming the array $\hat{y}_j(k+1)$ out of frequency space to derive the array $y_j(n)$ and to represent it as a seismogram in (j,n) space allowing exact discrete inverse-transformation, and modifying the array $y_j(n)$ to derive a modified seismogram, and including transforming the modified array $y_j(n)$ into the frequency domain to generate said modified array $y_j(k+1)$.

29. A method as in claim 24 including weighting selected combinations of traces of the seismogram in (l,n) space and slopes of the seismogram in (j,n) space to enhance or suppress the effect of the corresponding portion of the seismogram in (j,n) space.

30. A method as in claim 34 in which selected curves of the seismogram in (l,n) space transform to points in the seismogram in (j,n) space.

31. A method as in claim 30 in which said selected curves are nonlinear.

32. A method comprising:
deriving an original record of measurements of a selected parameter of energy propagating in a medium and sampled in time and in space;
transforming the original record to a record in tau-p space through a discrete transformation process which permits exact discrete inverse-transformation and which in processing in the frequency domain can be completed frequency-by-frequency and in processing in the spatial domain can utilize a transformation matrix having a block-circulant structure;
processing the tau-p space record to enhance desirable features thereof and effect an exact discrete inverse transformation from tau-p space to generate an improved record; and
providing a tangible representation of the improved record.

33. A method as in claim 32 in which said processing comprises processing the tau-p space record to enhance desirable features thereof and thereby generate an improved tau-p record to enhance desirable features thereof and thereby improved tau-p space record using an exact discrete inverse transformation to generate said improved record.

34. A method as in claim 33 including the step of providing a tangible representation of said improved tau-p space record.

35. A method as in claim 32 including the step of performing a spectrum shift upon said first record.

36. A method as in claim 35 in which said spectrum shift is incorporated in said transformation.

37. A method as in claim 32 in which the inverse transformation transforms the improved tau-p space record from the tau-p space to the space of the original record.

38. A method as in claim 32 including weighting selected combinations of traces of the original record and slopes of the record in tau-p space to enhance or suppress the effect of the corresponding portion of the tau-p space record.

39. A method as in claim 32 in which the transforming step comprises a transformation in which selected curves of the original record transform to points in the record in tau-p space.

40. A method as in claim 39 in which said selected curves of the original record are nonlinear.

41. A method comprising:
deriving an original record of data for a selected parameter sampled with respect to two independent variables defining an original domain;
transforming the original record to a record in a different domain in which each point results from a sum of values of said parameter taken over a corresponding pattern in said original domain, through a discrete transformation which permits exact discrete inverse-transformation and which in processing in a frequency domain corresponding to one of said independent variables can be completed frequency-by-frequency and in processing in said original domain with respect to the other of said independent variables can utilize a transformation matrix having a block-circulant structure;
processing said different domain record to enhance desirable features thereof and effect an exact discrete inverse transformation from said different domain to generate an improved record; and
providing a tangible representation of the improved record.

42. A method as in claim 41 in which said processing comprises processing said different domain record to enhance desirable features thereof and thereby generate an improved different domain record, and inverse-transforming said improved different domain record using an exact discrete inverse transformation to generate said improved record.

43. A method as in claim 42 including the step of providing a tangible representation of said improved different domain record.

44. A method as in claim 41 in which the inverse transformation transforms the improved different domain record from said different domain to said original domain.

45. A method as in claim 41 in which the transforming step comprises a transformation in which selected combinations of values of said original record and slopes of said different domain record are weighted to enhance or suppress the effect of the corresponding portion of the different domain record.

46. A method as in claim 41 in which said pattern is non-linear.

47. A method as in claim 41 in which said pattern is disjoint.

* * * * *